Sept. 21, 1937. J. J. MOJONNIER 2,093,894
LIQUID FILTER
Filed Sept. 1, 1936 4 Sheets-Sheet 1
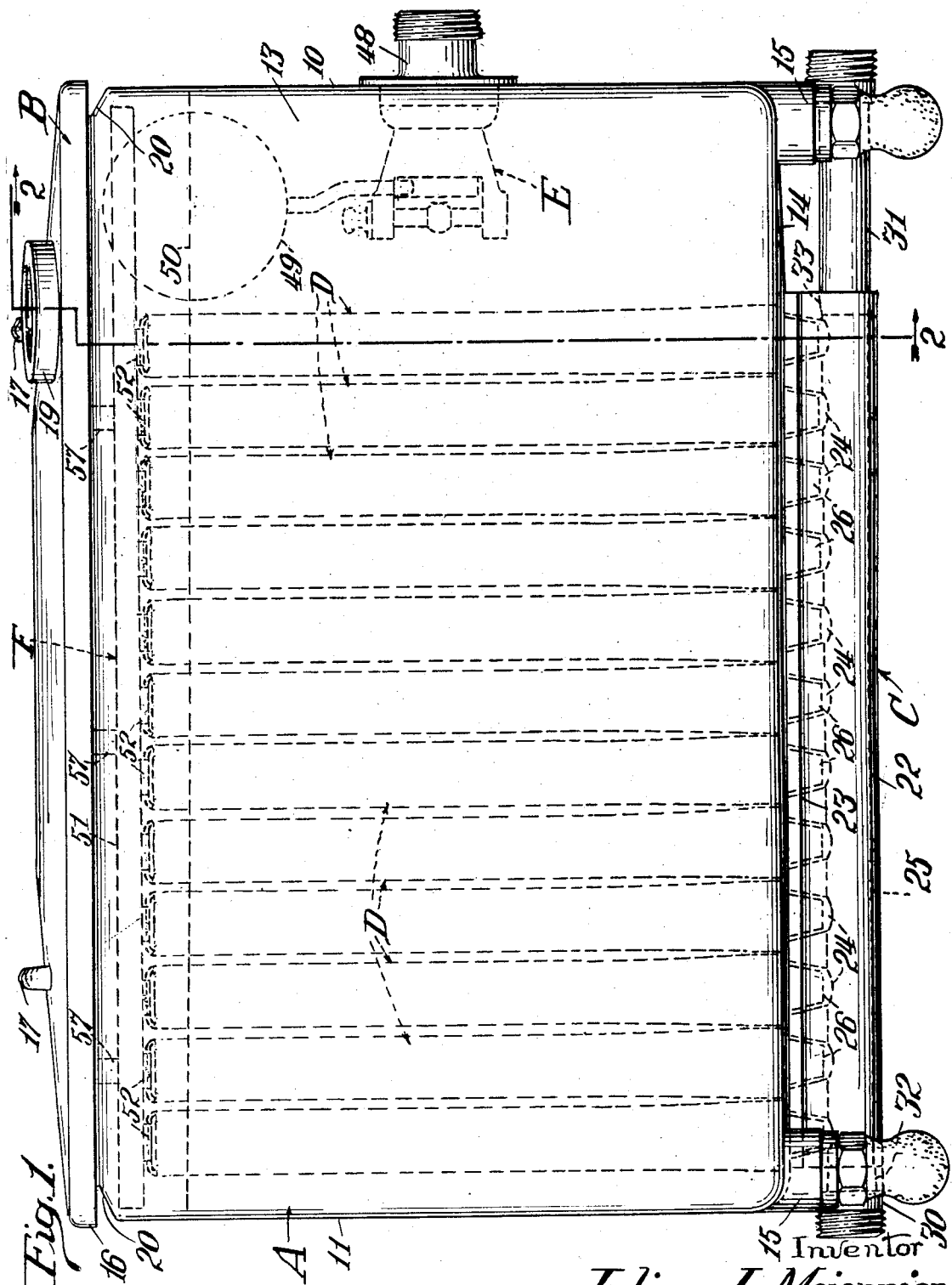
Inventor
Julius J. Mojonnier
By Thomas H. Ferguson
Attorney

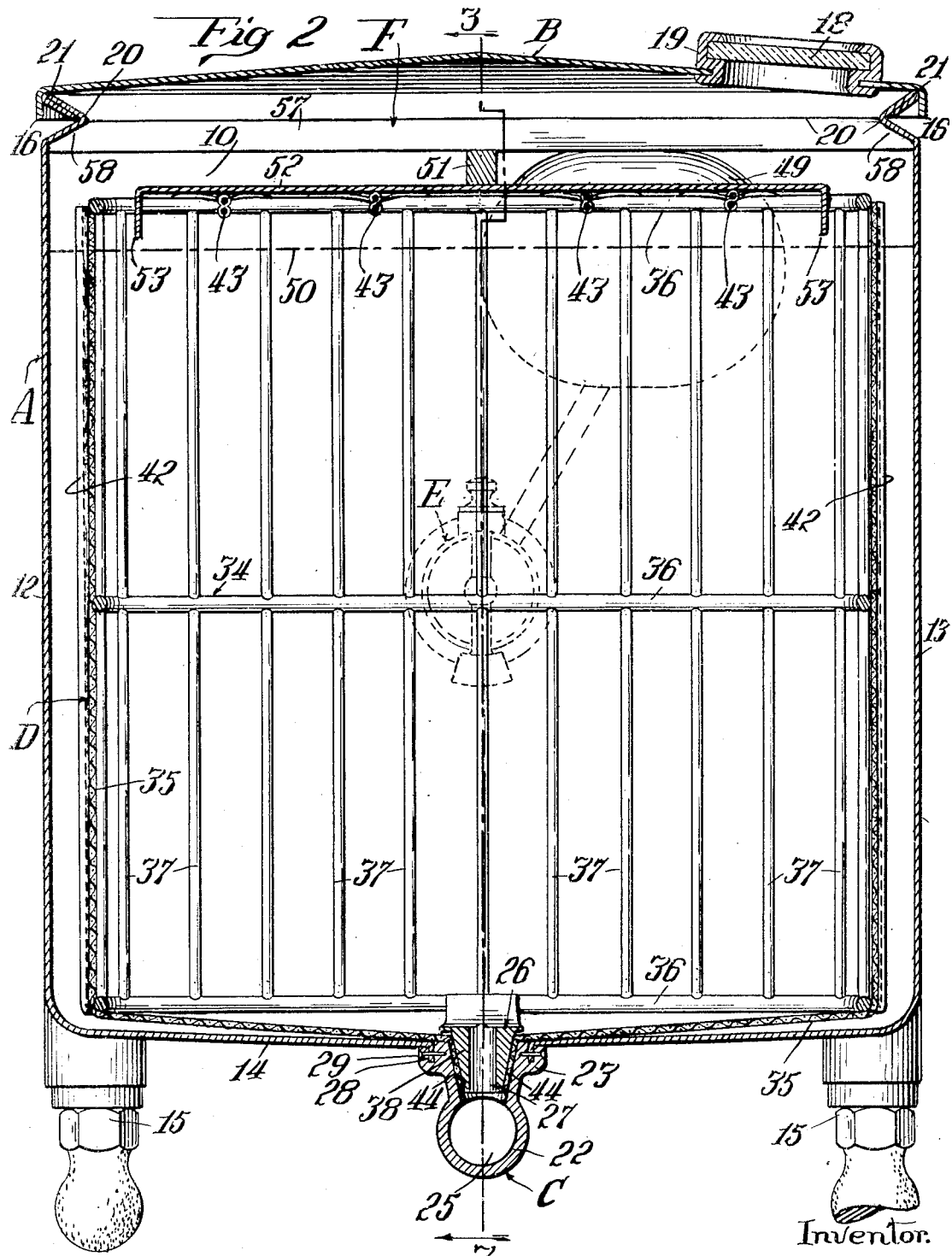

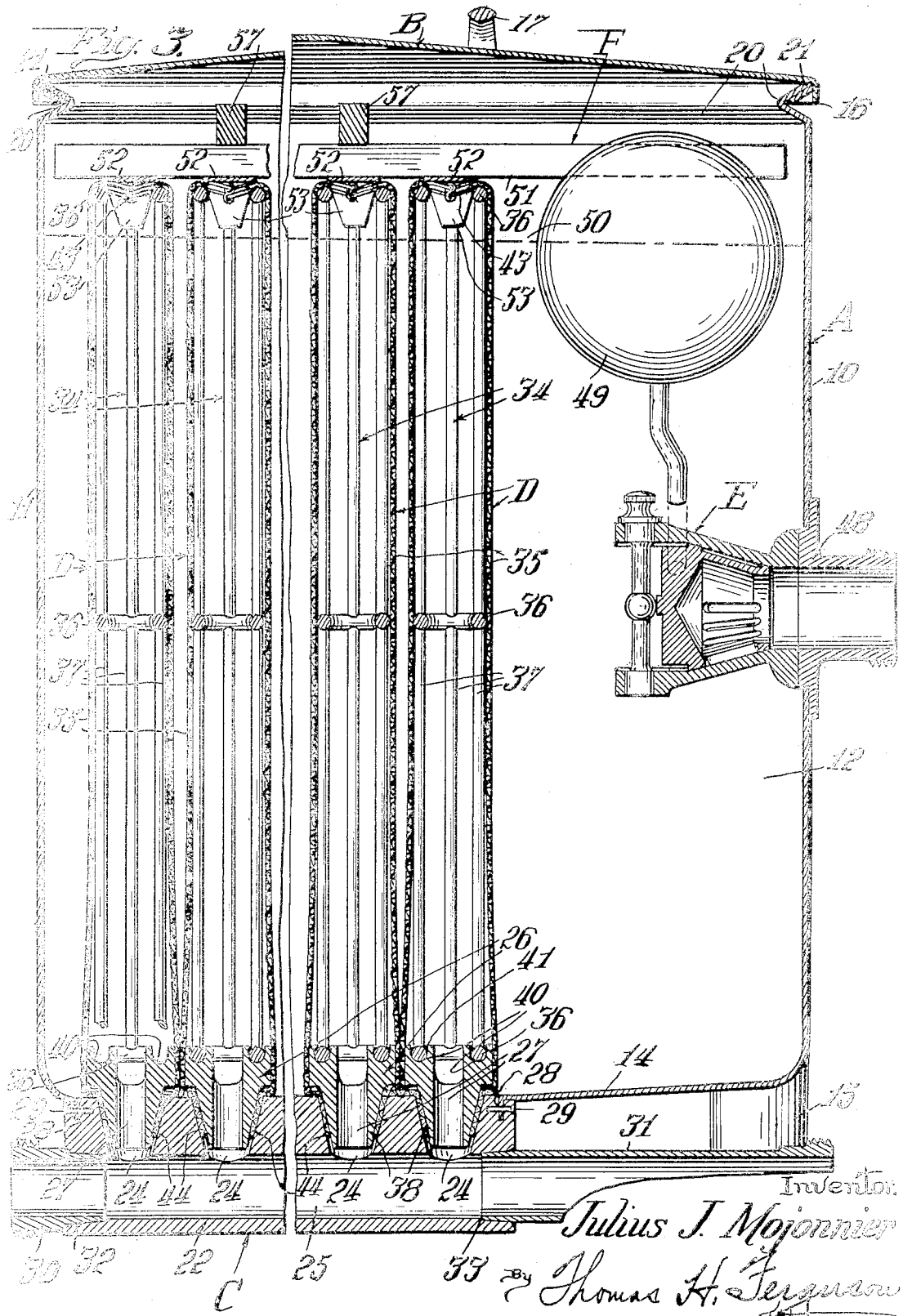

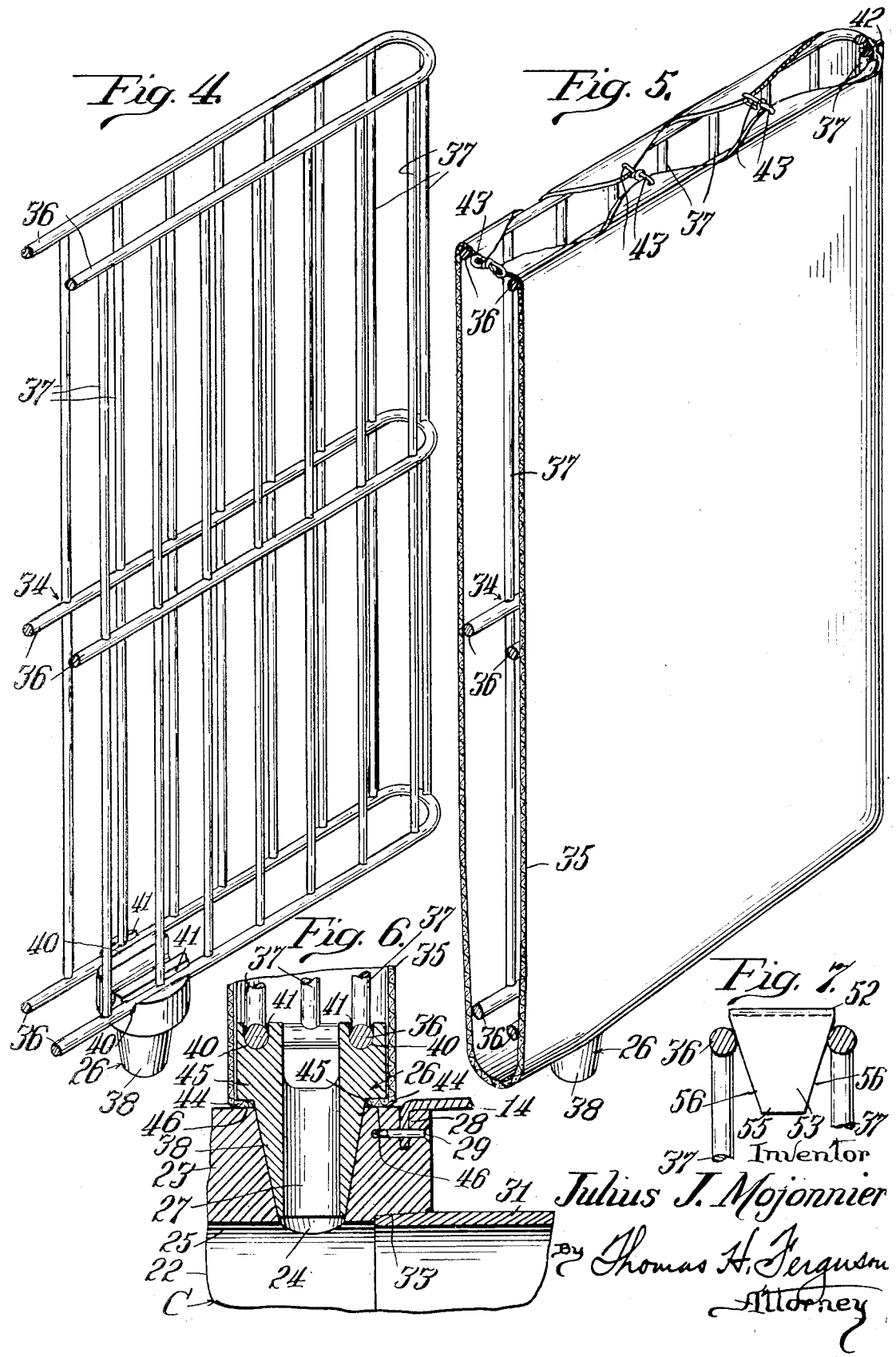

Patented Sept. 21, 1937

2,093,894

UNITED STATES PATENT OFFICE 2,093,894

LIQUID FILTER

Julius J. Mojonnier, Oak Park, Ill., assignor to Mojonnier Bros. Co., a corporation of Illinois Application September 1, 1936, Serial No. 98,948

2 Claims. (Cl. 210—181)

The present invention relates to liquid filters and the general object of the invention is to produce a liquid filter which may be economically manufactured, easily separated into its parts for cleaning and other purposes, efficient in operation, durable in service, capable of being made out of some of the harder metals and alloys which will not contaminate milk and milk products and one in which filtering units may be readily removed and replaced.

To this end the invention in its preferred embodiment includes a container, a manifold therein and filtering units which are independently supported by and operatively connected to the manifold. Preferably, also, there is a holding-down bar or frame for holding the units in proper position within the container. Each filter unit includes a supporting skeletal frame and an enclosing sack or bag made out of a suitable fibrous filtering material. The sack envelopes more or less of the frame as the builder may wish. The skeletal frame with the sack upon it can be readily removed from the container; then the sack can be removed as readily from the frame. When the several units are removed the interior of the container is smooth and may be readily washed out. Likewise the skeletal frame is sufficiently open to enable all of its parts to be thoroughly cleaned. For a new run the used sacks will be replaced by clean ones.

The new filter is particularly useful in the filtering of milk and the thinner milk products and will be described in that connection although obviously it may be used with other liquids, and its different parts may in some cases be separately used under other conditions of service and with altogether different liquids.

The invention will be best understood upon reference to the following detailed description taken in connection with the accompanying drawings and the scope of the invention will be particularly pointed out in the appended claims.

Referring to said drawings, Fig. 1 is a side elevation of a filter constructed and arranged in accordance with the present invention; Fig. 2 is a transverse vertical section of the same, the plane of section being indicated by the line 2—2 of Fig. 1; Fig. 3 is an interrupted longitudinal vertical section, the plane of section being indicated by the line 3—3 of Fig. 2, a portion of one of the skeletal frames being broken away near its bottom to more clearly show the grooves on the top of the associated plug, and furthermore the float of the supply valve being shown in elevation although the same lies forward of the plane of section; Fig. 4 is a perspective view of a portion of one of the skeletal frames used in making up a filter unit; Fig. 5 is a similar view illustrating a sack upon the frame, a portion of the frame being cut away to show the sack seam more clearly; Fig. 6 is a detailed view illustrating the connection between the skeletal frame, the sack and manifold, particularly after the sack has been used for some time and the opening through which the connection is made, has become somewhat enlarged; and Fig. 7 is a face view of one of the centering members positioned on the holding-down frame, the same being shown in relation to one of the loop members of the skeletal frame. Throughout these views like characters refer to like parts.

The container A may be made up in various forms. In the present instance it is rectangular in plan and elevation, having ends 10, 11, sides 12, 13 and a bottom 14. It is preferably composed of sheet metal formed out of a minimum number of sheets suitably welded or otherwise secured together so as to provide smooth exterior and interior surfaces free from crevices and corners, which if present would collect foreign matter and become centers of corruption and uncleanness. The container body thus formed may be supported in any desired way. In the present instance there are four sets of legs and feet 15. Preferably these are composed of metal and are welded or otherwise secured to the outer edges of the bottom 14. The container thus formed constitutes an enclosing chamber in which the filtering units are mounted.

A suitable cover B is provided out of a single sheet of metal similar to that of the body A and the same is provided with a peripheral flange 16 which is adapted to fit over the upper edge of the body A. The cover B is provided with one or more handles 17, preferably located toward its ends and near its longitudinal axis. The cover is also preferably provided with a peek-hole for inspection of the liquid within the filter while the cover is in position. This peek-hole is provided by a transparent eye-piece 18 of glass which is properly mounted in a supporting frame 19 which in turn is positioned in an opening in the cover B.

The upper edge of the body A is provided with a specially constructed lip which cooperates with the flange 16 upon the cover to provide a tight fit between the cover and the body. These results are brought about by giving the upper edge of container walls an inward flange-like projection 20. This is formed by giving the metal inward and outward bends with a turned-back edge 21, as illustrated. The two angularly disposed portions provide a cross-sectional outline of V-shape with the opening extending outward. When the cover is applied, then the extreme upper edge 21 engaged by the cover is pressed downward and the V-shaped structure is resilient enough to bring about an adjustment of the edge to meet irregularities in the cover and thus bring about a tight closure at all points. In addition, the inwardly extending projection 20 serves to engage certain bars of the holding-down means employed to keep the filtering units in position, as will appear more fully hereinafter.

Extending lengthwise of the body A, and preferably along its longitudinal center, is a manifold C which is in the form of a metal casting to which the adjacent edges of the bottom 14 and end wall 11 are connected. As clearly shown, the manifold C is a channeled member having a main tubular portion 22 and a main body portion 23, both portions preferably formed in one integral casting. The body portion 23 is provided with a series of conical openings or apertures 24. These openings extend upward from the main passage 25 in the tubular portion of the manifold and perform several functions. One of these is to receive the plug-shaped fittings 26 of the filter units in order to support the units in proper position within the container. Another is to provide an opening between the main opening 25 of the manifold and the interior of the filter unit. And a third is to cooperate with the plug connection 26 in securing the fibrous filter sack in place. And here it may be remarked that each plug 26 has a vertical opening 27 by which communication is made between the main passage 25 of the manifold and the interior of the associated sack when the parts are assembled.

The connections between the manifold body 22 and the adjacent portions of the sheet metal container body A may be made in different ways. In the present instance the manifold body as shown is provided with vertical slots such as the slot 28. Into these slots the flanged or bent edges of the adjacent sheet metal are inserted and when properly inserted they are held in place by pins 29 which pass through suitable openings in the body 23 and the sheet metal, all as clearly illustrated.

The manifolds C may be variously connected to external piping. In the present instance a short pipe or nipple 30 is shown at one end of the main tubular passage 25 and a somewhat longer piece of pipe 31 is shown at the other end. These pipe connections are suitably threaded at their outer ends for connection to other pipes or connections and they are tapered at their inner ends to engage tapered openings 32 and 33 at the ends of the tubular portion 22 of the manifold. By using the tapered connections the pipes 30 and 31 may be easily removed. When removed, both pipes and manifold may be readily cleaned.

Coming now to the filter units themselves, there are preferably quite a number of these units and they are arranged side by side as indicated more particularly in Figs. 1 and 3. In the embodiment illustrated, there are twelve such units, designated D. Each unit includes a skeletal frame 34 and sack or bag 35. The unit as a whole is preferably flat in its general outline and appearance. Its dimension in the direction of the length of the container, when the parts are assembled, is relatively short. This may be considered its thickness. Considered transversely of the direction of thickness, as so defined, the unit is relatively wide and high. These transverse dimensions are such that the unit, transversely considered, quite fully takes up the available space within the container A. In other words, the unit's width is slightly less than the width of the container, and the unit's height is slightly less than the height of the container.

In the ordinary operation of the filter, the liquid to be filtered passes through the sack walls in each case from the outside to the inside. From the interior of each sack it passes out through the plug opening 27, the associated manifold branch opening 24 and main manifold opening 25. Thus, the two members, the plug and manifold constitute conduit and channeled members or fittings which provide for the proper travel of the liquid being treated. From the main channel 25 of the manifold the liquid passes out of and away from the filter. Although this is the preferred operation, it will be apparent that the direction of flow might be reversed, the liquid entering by the manifold C, passing through the sack walls outward and thence from the container A by suitable outlet or discharge means. Thus, conduit connections are provided by the plugs and manifold parts which furnish the requisite passages and channels for the liquid being filtered and the sack walls serve as filtering diaphragms. As clearly shown, when the parts are assembled, more or less of the plug end and more or less of the manifold body lie entirely below the lowermost portions of the sacks. In other words, a portion of the passage leading to the interior of the sack, in each instance, is wholly outside of the sack, while another portion is that leading through the sack opening and therefore extending between those portions of the sack which embrace the plug or are gripped between the plug and manifold.

The skeletal frame 34 may be variously constructed. In the present instance it is composed of three substantially horizontal loops 36 connected by vertical rods 37. The loops are shaped so as to give the flat general appearance previously mentioned and the length of each loop is made sufficient so as to take up most of the available width within the container A. Similarly the rods 37 are of such length as to take up most of the height available within the container. The rods 37 may be connected to the loops in any suitable way. Preferably this is done by electric welding. The rods 37 may be long rods extending the full height of the frame 34 or they may be short rods extending between the several loops 36, in the one case from the upper loop to the intermediate loop and in the other case from the intermediate loop to the lower loop.

Each skeletal frame 34 is provided with one of the conical plugs 26. Preferably, each plug terminates at its lower end in a conical portion 38 which constitutes the plug proper. The portion of the plug above this conical projection provides the metal necessary for connection with the frame 34. As clearly shown, the upper portion of the plug has a plurality of grooves 40 formed in its upper surface. These grooves are of sufficient size to take in the rods forming the sides of the lowermost loop 37. When the parts are properly assembled the grooves 40 are preferably filled with silver solder 41 so as to secure the plug and skeletal frame together. Obviously other ways of connecting the parts might be employed. In some instances it might be desirable to weld the frame and plug together.

When the parts are assembled and the units are properly located within the container A, then obviously each skeletal frame 34 is mechanically supported from beneath solely by the plug 26 which is secured to it, the plug of course in turn being seated in the conically walled socket of the manifold C to which it has been assigned.

The filter sack 35 is made of suitable fibrous, filtering web material. Various materials may be used for the purpose, depending, of course, upon the liquid to be treated, degree of filtering required and other elements with which workers in this art will be familiar.

Having determined upon the kind of web material to be used, then it is only necessary to make up the sack so as to properly inclose the skeletal frame 34. In the instance illustrated, a single piece of material is employed. The width of the piece should be slightly greater than the width of the skeletal frame and the length of the piece equal to about twice the height of the skeletal frame. With such a piece folded midway of its length, it will be obvious that by sewing together the edges a suitable open-mouthed sack will be provided. Sewing the edges together in this way may leave a welt or short flaps if the stitching be back a little way from the edges. The latter stitching is that illustrated and the edges beyond the stitching form the flaps 42, indicated more particularly in Figs. 2 and 5.

By having the initial length of the material right, it will follow that the upper ends of the sack will terminate in the vicinity of the uppermost loop member 36 of the skeletal frame. Of course, it is obvious that the upper open end of the sack might come further down upon the skeletal frame than shown but it is desirable to obtain the benefit of the full height of the frame and therefore it is preferable to have the upper end of the sack come up as high as the top of the frame, just as shown. As indicated, opposite portions of the sack near its open mouth may be provided with short pieces of tape 43 or the like which constitute ties and may be tied together to bring the sack into close engagement with the skeletal frame.

It should be noted, however, that before the sack 35 is used in its final position upon the skeletal frame, it is provided with an opening for the passage of the plug 26. Ordinarily, and as shown, the plug is midway of the width of the skeletal frame and therefore when the sack is about to be placed upon the skeletal frame, the lower edge of the sack is cut so as to provide a small opening which will just pass over the lower end 38 of the plug. Once the plug has passed through the opening, then the tie string 43 may be drawn up so as to render the sack walls taut upon the frame. Thus, by drawing tightly upon the string 43, the sack is fully distended and ready when properly positioned in the container to strain or filter the liquid. Obviously, the opening 24 for the plug 26 is in line with the plug. So it follows that if the plug were positioned near the bottom instead of directly at the bottom of the frame 34 as illustrated, then the opening in the sack would be correspondingly shifted from the position shown.

In this connection it may be pointed out that when a particular sack 35 is new and the hole for the passage of the plug 26 has been carefully made, the portions of the sack adjacent to the plug will extend down a considerable distance over the conical surface of the plug. This is indicated by the lower edge 44 of the sack material in Figs. 2 and 3. Of course, as the sacks are used it will be necessary to remove them from the frames and have them washed. Thus, a given sack may be used many times over. As it is thus used, the opening through which the plug 26 is passed, will gradually grow larger and larger. In such case, as the sack is placed in position, the lower edge 44 will gradually recede from the point of the plug and more nearly approach the base of the cone, which is of larger diameter. This gradual receding may occur until the edge of the material no longer passes down over the conical surface of the plug. In such instance, a shoulder 45, near the base of the conical extension 38, will cooperate with the adjacent flat portion 46 upon the manifold body 23 to securely clamp and hold the edge 44 of the sack material. Such a position of the sack material is shown in Fig. 6. Of course, when the opening in the sack through which the plug 26 passes, becomes so great that the cooperating surfaces 45 and 46 can no longer effectively engage the sack material, the sack must be discarded and a new one used in its place.

In this connection it may be pointed out that in either holding of the fabric (whether as shown in Figs. 2 and 3 or in Fig. 6), the action is that of a plug pressing the fabric against the plug seat. In one case the most effective action may be between the conical faces of the plug and socket, while in the other case the action will be entirely between the plug peripheral shoulder 45 and the peripheral seat 46. Of course when the sack engages well with the conical walls of the plug and socket, as in Figs. 2 and 3, the shoulder 45 will not press the sack against the flat seat 46, while, on the other hand, when the gripping engagement of the parts with the sack is that provided by the shoulder 45 and seat 46, then the conical faces of the walls and socket will substantially engage each other without any intervening sack material, as clearly shown in Fig. 6.

Obviously, the sack material thus gripped between the plug and its seat will not only be firmly and securely held but the same will act as a gasket between the parts and thus insure a tight filter-proof joint so that all liquid passing through the filter will be properly filtered.

As before indicated, the manifold C is preferably an outlet manifold and the liquid to be treated is supplied to the interior of the container A at some other point outward of the sack walls. This may be accomplished by hand operation, the cover being removed and the liquid poured into the container. On the other hand, the liquid may be supplied through a pipe connection. This is preferable where the material to be treated is milk. In the latter case, a large inlet pipe is employed. In the embodiment illustrated such a pipe, designated 48, passes through an aperture in the end wall 10. On the inside of the wall 10 is a valve E which is controlled by a float 49 to maintain a liquid level approximating the level line 50. The valve E is of well known construction and need not be particularly described. It is fully disclosed in United States Patent No. 1,956,077, granted April 24, 1934 to applicant's assignee.

In order to insure a firm connection between the lower ends of the filter units and the cooperating engaging faces of the manifold, it is desirable to employ means which will press down upon the upper portions of the unit frames to hold them down, and, at the same time, insure a definite position for each of the units in the container. It will be apparent that different means may be provided for this purpose. In the present instance, the hold-down frame F comprises a hold-down bar 51 which extends lengthwise of the container and therefore crosswise of the units so as to bring pressure upon all of the units. Associated with this main bar 51 are transverse bars or plates 52, one for each filter unit, which serve to properly position the units. As shown, the transverse plates 52 are secured to the under side of the bar 51 and extend at right angles to the same. The outer ends of the bars 52 carry downwardly projecting tongues 53 which are adapted to pass down between the opposing portions of the upper loop 36 of the skeletal frame 34, in each case.

This construction in practice results in holding the several units in parallel relation. It will be noted that the width of the tongue 53 is such as to engage the adjacent sides of the upper loop 36 and press the same apart when all the parts are in assembled relation. This is shown perhaps more clearly in Fig. 7, wherein one of the tongues is shown upon a somewhat larger scale. As there shown, the tongue is in general triangular in form and terminates in a dull point 55 which readily passes between the loop members when the frame F, consisting of the bar 51 and associated cross-bars 52, is put in place. The inclined edges 56 upon the tongue 53 engage the upper loop sides and spread them a proper distance apart and also throw the loop to the right or left, as may be necessary, to properly center it.

In this connection it may be pointed out that the central bar 51 is of substantial size since it must carry the load imposed by the upward thrusts coming from the several frames or baskets 34. In contrast to the main bar 51, the cross-bars 52 are relatively thin and broad so as to provide resiliency such that they will apply a spring pressure down upon the frame 34. The pressure exerted by the spring bars 52 is opposed by the resistance to spread offered by the uppermost loop 36 and the angularity of the edges 56. These are preferably such that the parts will assume the positions shown when assembled. The result of the application of spring pressure in this way is to insure a firm seating of the several plugs 26 in their sockets with the intervening sack material properly gripped and held for gasket service. Furthermore, there is an assured proper positioning of the sacks upon the frames due to the spreading of the upper loop 36 which draws upon the sack material and gives the same the requisite tautness.

Thus, it will be clear that when the frame F, consisting of the longitudinal bar 51 and the transverse bars 52, is set upon the assembled filter units D, and properly settled down into place, then it is only necessary to apply a reasonable pressure to the frame and preferably only against the upper face of the bar 51, in order to hold all of the units in proper parallel assembled position. In the present instance, the bar 51 is held in place by three transverse retaining bars 57. These are separate bars which are individually placed over the top of the bar 51 and then moved in a horizontal plane until their ends 58 properly engage under the overhanging projection 20 at the rim of the container. As clearly shown, particularly in Fig. 2, the ends 58 are inclined on their upper surfaces with an inclination corresponding to that of the V-shaped lip 20, formed at the rim of the container as before described. Once the transverse bars 57 are in position they will exert a considerable pressure upon the holding-down bar 51. All these bars are composed of metal, and preferably have some resiliency, so that in slipping the cross-bars 57 into place under the container projections 20, there will be some spring action which will serve to hold the parts firmly in place.

Obviously, the holding-down mechanism F will be applied to the units after the skeletal frames have received their jackets or filter sacks. As a result, the transverse plates 52 will not engage the upper loop 36 throughout the length of the latter but may do so at points along its length, depending upon the resiliency of the material out of which the bars are made. In any event, there will be a layer of the sack material between the bars or strips 52 and the adjacent loop 36 at many points. The way in which the parts engage, whether with intervening material or not, of course, is not so important. It is sufficient if the tongues 53 upon the bars 52 properly position the associated filter units.

From what has been said, it will be clear that the liquid to be treated, whenever the automatic valve is in service, will be kept at a constant level approaching the top of the several filter units. The liquid supply, maintained by the automatic action of the valve, will be sufficient to operate the filter at its maximum capacity. As before indicated, the liquid within the container will engage the outer surfaces of all the sacks 35 upon the several skeletal frames 34 and will pass through those sacks into the spaces within the interiors of the units and thence out through the openings 27 in the plugs 26 and the branch openings 24 to and through the main outlet opening 25 of the manifold C. When the filtering of the desired amount of liquid has been completed, then the supply line may be closed and the quantity of liquid within the filter allowed to pass off through the filtering sacks and the manifold as just explained. When this point in the emptying of the filter has been reached there will still be a small amount of liquid in the filter. In such case it will be necessary to remove the hold-down frame F, and then raise one of the filtering units D. As soon as such unit D is raised out of its normal position, the residue of the liquid within the container will pass off through the manifold, which should, in the meantime, have its outlet connection changed so as to prevent unfiltered liquid from mixing with the filtered liquid. As will be apparent, the several units D may be removed at will from the container as soon as the holding-down frame F has been removed. When removed from the container each unit may have its tie pieces 43 untied and the sacks 35 removed. The sacks may then be washed or otherwise treated and made ready for subsequent service. Likewise the frames on which the sacks have been located may be thoroughly cleansed and put in condition for further service. Furthermore the interior of the container A and the members of the holding-down frame F may be thoroughly cleansed. The manifold, too, may have its connections removed and be thoroughly cleansed, as before indicated. When ready to proceed with a new filtering operation, the frames 34 must be covered again with sacks, and the units, as thus made up, placed in the container with the holding-down mechanism properly positioned.

In carrying out my invention it will be apparent that many alterations and modifications may be made in the structure shown without departing from the spirit and scope of the invention. It is therefore desired that in considering the claims all those alterations and modifications which rightly come within the scope of the invention be accepted as covered by the terms of the claims.

I claim:

1. In a liquid filter, a container, a manifold positioned at the bottom of said container, said manifold having a main passage and upwardly extending openings, a plurality of skeletal filter frames within said container; each said skeletal frame having parallel walls of open work formed by intersecting rods secured together and spaced apart sufficiently to permit each constituent rod to be scrubbed and cleaned on all sides, said frame being about the height of the container, its length a little less than the width of the container and its thickness in the direction of the length of the container, relatively short, the thickness being such as to hold the filtering fabric on the frame walls well apart out of possible contact; an envelope of fibrous filtering material stretched over each said skeletal frame, said envelope having at its top a large mouth through which the frame may enter into the interior of the envelope when assembling the frame and envelope, conduit means upon said skeletal frames adapted to enter said upwardly extending openings in said manifold, said envelope also having a small opening positioned therein so as to permit said conduit means to pass therethrough, said envelope and conduit means having a filter-proof connection with each other, the interiors of said envelopes thus being placed in communication with said main passage, a holding-down bar extending lengthwise of said container, positioning members, one for each said skeletal frame, associated with said holding down bar and operative under the pressure of said bar to engage said skeletal frames to center them so as to stand in substantially parallel relation, cross bars for applying pressure to said holding-down bar, and means at the rim of said container for engaging said cross bars to hold the same in pressure applying position when once so set.

2. In a liquid filter, a container, a manifold positioned at the bottom of said container, said manifold having a main passage and upwardly extending openings, a plurality of skeletal filter frames within said container; each said skeletal frame having parallel walls of open work formed by intersecting rods secured together and spaced apart sufficiently to permit each constituent rod to be scrubbed and cleaned on all sides, said frame being about the height of the container, its length a little less than the width of the container and its thickness in the direction of the length of the container, relatively short, the thickness being such as to hold the filtering fabric on the frame walls well apart out of possible contact; an envelope of fibrous filtering material stretched over each said skeletal frame, said envelope having at its top a large mouth through which the frame may enter into the interior of the envelope when assembling the frame and envelope, conduit means upon said skeletal frames adapted to enter said upwardly extending openings in said manifold, said envelope also having a small opening positioned therein so as to permit said conduit means to pass therethrough, said envelope and conduit means having a filter-proof connection with each other, the interiors of said envelopes thus being placed in communication with said main passage, a holding-down bar extending lengthwise of said container, transverse relatively thin and broad plates beneath said holding-down bar, one said plate for each of said frames, and each said plate exerting a downward spring pressure upon its associated frame, downwardly projecting centering tongues on each of said plates operative to engage the opposing parallel walls of the associated skeletal frame, said transverse plates and tongues operating under the pressure of said holding-down bar to aline said frames in parallel relation and hold them there, cross bars for applying pressure to said holding-down bar, and means at the rim of said container for engaging said cross bars to hold the same in pressure-applying position when once so set.

JULIUS J. MOJONNIER.